Figure 1:
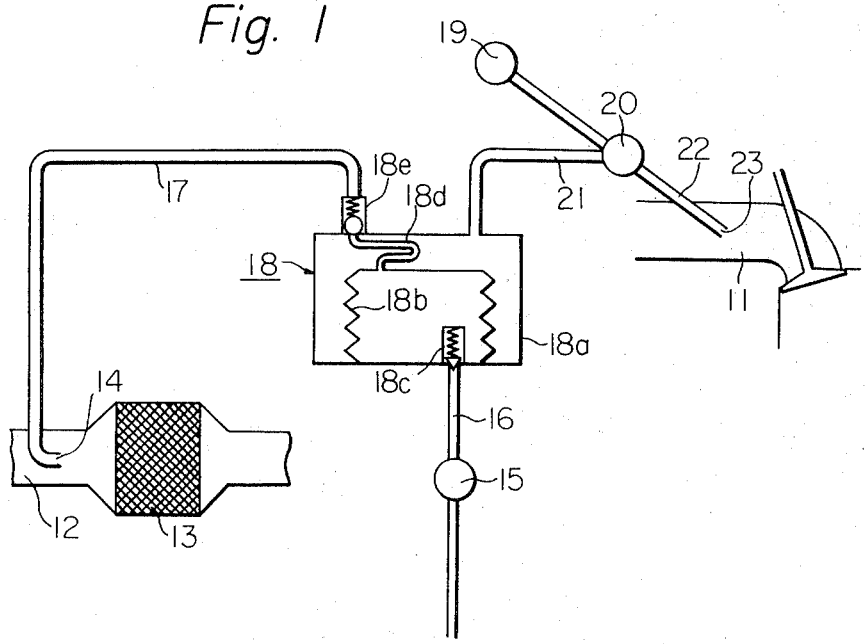

United States Patent [19]
Hayashi

[11] 3,827,238
[45] Aug. 6, 1974

[54] DEVICE FOR SUPPLYING A SUPPLEMENTARY FUEL TO A CATALYTIC ENGINE EXHAUST CLEANER

[75] Inventor: Yoshimasa Hayashi, Yokohama, Japan

[73] Assignee: Nissan Motor Company, Limited, Kanagawa-ku, Japan

[22] Filed: May 21, 1973

[21] Appl. No.: 362,297

[30] Foreign Application Priority Data
May 31, 1972 Japan................................ 47-54202

[52] U.S. Cl..................................... 60/286, 60/301
[51] Int. Cl............................................. F02b 75/10
[58] Field of Search...................... 60/286, 301, 303

[56] References Cited
UNITED STATES PATENTS
| | | | |
|---|---|---|---|
| 1,839,879 | 1/1932 | Hyatt | 60/303 |
| 3,732,696 | 5/1973 | Masaki | 60/274 |
| 3,768,259 | 10/1973 | Carnahan | 60/286 |
| 3,779,014 | 12/1973 | Nohira | 60/286 |

Primary Examiner—Douglas Hart

[57] ABSTRACT

A device for supplying and metering supplementary fuel to a catalytic exhaust gas cleaner for increasing the efficiency of the catalyst, comprising a fuel reservoir, the flow rate of fuel from which is controlled by the presence of secondary air supplied to the exhaust system for increasing the re-combustion efficiency thereof.

11 Claims, 2 Drawing Figures

DEVICE FOR SUPPLYING A SUPPLEMENTARY FUEL TO A CATALYTIC ENGINE EXHAUST CLEANER

This invention relates to an automotive exhaust emission controlling device, and more particularly to a device for supplying supplementary fuel to exhaust gases to promote reduction of nitrogen oxides contained in the exhaust gases.

A catalytic converter or reactor mounted in an exhaust system of an automotive internal combustion engine generally includes a reduction catalyst for decomposing nitrogen oxides (NOx) contained in the exhaust gases into inoxious forms. The present invention contemplates to supply supplementary fuel (HC) to the exhaust system in an amount suitable for promoting the reduction reactions ($NO_x + HC \rightarrow N_2 + H_2O + CO_2$) under certain operating conditions of the engine. This invention can be most effectively applied to an emission controlling system where the engine is operated at fuel-air mixtures which are not richer than stoichimetric under normal cruising conditions for keeping the levels of carbon monoxide (CO) and hydrocarbons (HC) in the exhaust gases at a minimum while supplying supplementary fuel to the exhaust system for supplementing hydrocarbons which are required in the catalytic reduction of nitrogen oxides only under relatively high load operating conditions of the engine which involve an increased amount of nitrogen oxides.

In exhaust emission controlling systems of the nature as mentioned above, the exhaust gases contain only a small amount of hydrocarbons unless a mixture enriching device which is connected, for example, to the carburettor is operated. It is therefore necessary to supply supplementary fuel to the exhaust gases in an amount proportional to the amount of the nitrogen oxides produced, or to the amount of intake air of the engine. In other words, the amount of the supplementary fuel should be controlled in accordance with the operating conditions of the engine.

The exhaust systems of internal combustion engines may be supplied with secondary air for oxidizing residual combustible compounds including hydrocarbons and carbon monoxide into final end products of water and carbon dioxide. Such secondary air is introduced into the exhaust manifold of the engine at a pressure higher than the exhaust gas pressure. That is, $$Pa \approx KPe \quad (1)$$

where $Pa$ denotes secondary air pressure, $Pe$ the exhaust gas pressure and $K$ a constant $> 1$. From $$Q_1 = AQe \quad (2)$$

$$Ve = Qe/Se \quad (3)$$

$$Pe = \rho/2g \cdot Ve^2 \quad (4)$$

where $Q_1$ represents the intake air flow rate of the engine, $Qe$ the flow rate of exhaust gases, $Ve$ the velocity of exhaust gases, $Se$ the cross sectional area of the exhaust system, $\rho$ the density of exhaust gases, $g$ the acceleration of gravity, and $A$ a proportional constant, we obtain $$Pe = (\rho/2gA^2Se^2) \cdot Q_1^2 = B \cdot Q_1^2 \quad (5)$$

where $B$ represents a proportional constant. Thus, the pressure of the secondary air is proportional to the square of the intake air flow rate of the engine.

The present invention is based on and utilizes the fact that the secondary air pressure is controlled in proportion to the square of the intake air flow rate of the engine by means not shown but well known in the art, in controlling the amount of supplementary fuel to be supplied to the exhaust gases. This utilization of secondary air pressure greatly contributes to simplifying the control of the supplementary fuel supply. Supplementary fuel should be supplied to the exhaust system only under high load operating conditions of the engine and should preferably be retained in a reservoir under low load operating conditions of the engine in which no substantial amount of nitrogen oxides is produced. Furthermore, in continued operation, in for example, suburban open areas where the control of the exhaust emissions is not required, the supply of supplementary fuel should preferably be automatically stopped after a short period of time in order to hold the consumption of extra fuel to a minimum. This can be attained by attributing a limited capacity to the fuel reservoir so that the reservoir is emptied during continued high load engine operations over a predetermined period of time.

It is an object of the present invention to provide a device for supplying supplementary fuel to a system for catalytically cleaning exhaust gases emitted from a cylinder of an internal combustion engine, the device utilizing the pressure of secondary air for supplying the supplementary fuel to the exhaust gases in an amount proportional to the square of the intake air flow into the engine.

It is another object of the present invention to provide a supplementary fuel supplying device of the nature mentioned above, whereby the supplementary fuel is supplied to the exhaust system of the engine only under high load operating conditions of the engine.

It is still another object of the present invention to provide a supplementary fuel supplying device of the nature mentioned above, wherein the supplementary fuel to be supplied to the exhaust system of the engine is stored in a reservoir under low load operating conditions of the engine.

It is a further object of the present invention to provide an supplementary fuel supplying device of the nature mentioned above, whereby the supply of supplementary fuel to the exhaust system is automatically stopped after a limited period of time during continued high load engine operations in suburban open areas where control fo exhaust emission is not required.

It is a still further object of the present invention to provide a supplementary fuel supplying device of the nature mentioned above, which device is simple in construction and reliable in operation.

According to the present invention, there is provided a supplementary fuel supplying device in a system for cleaning exhaust gases emitted from a combustion chamber of an internal combustion engine, comprising a secondary air passage communicating with an exhaust system leading from an exhaust port of the combustion chamber and having a pump means for supplying secondary air into the exhaust system, a catalytic converter mounted in the exhaust system for decomposing pollutants in the exhaust gases, a supplementary fuel supplying passage communicating with the exhaust system upstream of the catalytic converter for supplying supplementary fuel thereto and having a downstream portion connected to the exhaust system and an upstream portion having a pump means, a supplementary fuel reservoir interposed between the upstream portion and downstream portion of the supplementary fuel supplying passage and having an outer casing with a fuel inlet communicating with the upstream portion of the supplementary fuel supply passage through a first one-way valve with which allows flow of fuel only in a direction into the supplementary fuel reservoir, a fuel outlet communicating with the downstream portion of the supplementary fuel supplying passage through a second one-way valve which allows flow of fuel only in a direction toward the exhaust system, an air port communicating with the secondary air passage for introducing secondary air into the fuel reservoir, and a collapsible chamber disposed in the fuel reservoir and having a volume varying in accordance with the level of secondary air pressure for discharging supplementary fuel stored in the fuel reservoir into the exhaust system at a rate proportional to the square of the intake air flow rate into the engine.

In one specific embodiment of the invention, the collapsible chamber is formed of bellows and fixed at one end thereof to the inner wall of the outer casing of the fuel reservoir, the fixed end of the collapsible chamber having a fuel inlet in registry with the fuel inlet of the outer casing and the other free end of the collapsible chamber having a fuel outlet which is connected to the fuel outlet of the outer casing by way of a flexible tube.

In another specific embodiment of the invention, the collapsible chamber is formed of bellows and fixed at one end thereof to the inner wall of the outer casing of the fuel reservoir, the fixed end of the collapsible chamber having an air port in registry with the air port of the outer casing of the fuel reservoir.

Figure 2:
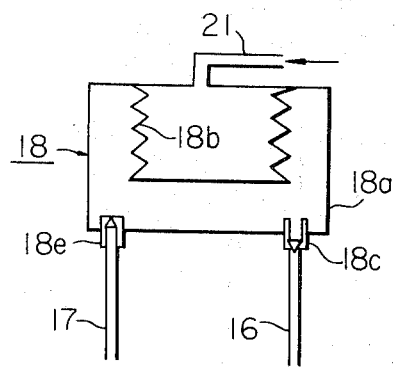

The above and other objects, features and advantages of the present invention will become more obvious from the following description when taken in connection with the accompanying drawing which shows, for purpose of illustration only, preferred embodiments in accordance with the present invention, and wherein:

FIG. 1 is a diagrammatic view showing an embodiment of a supplementary fuel supplying device in accordance with the present invention; and FIG. 2 is a diagrammatic view showing a modified configuration of a supplementary fuel reservoir employed in the present invention.

Referring to FIG. 1 showing a first embodiment of a supplementary fuel supplying device of the invention, there is shown at 11 an exhaust manifold leading from an engine cylinder or combustion chamber and at 12 an exhaust pipe which is connected to the exhaust manifold 11. A numeral 13 designates a catalytic converter or reduction catalyst mounted at a suitable position in the exhaust pipe 12. Supplementary fuel is supplied to exhaust gases through a supplementary fuel supply nozzle 14 which opens into the exhaust pipe 12 upstream of the reduction catalyst 13.

Designated as 15 is a fuel pump for supplying supplementary fuel to the supplementary fuel supply nozzle 14 through fuel passages 16 and 17. These fuel passages have interposed therebetween a fuel reservoir 18 which includes an outer casing 18a and a contractable or collapsible chamber 18b formed of for example, bellows as shown in the drawing and secured at one end thereof to the inner wall of the casing 18a. The other, free end of the collapsible chamber 18b is closed so that the volume of the chamber 18b is varied in dependence on the pressure prevailing in the outer casing 18a. The collapsible chamber 18b communicates with the fuel passage 16 through a spring-loaded one-way valve 18c which allows flow of fuel only in a direction into the collapsible chamber 18b, and with the passage 17 through a flexible pipe 18d which extends between the fuel receiving end of the passage 17 and the movable end of the collapsible chamber 18b, and a spring-loaded one-way valve 18e which allows flow of fuel only in a direction away from the collapsible chamber 18b. It will be noted the level of pressure required to open the one-way valve 18e is greater than that required to open the one-way valve 18c. There is shown at 19 a secondary air pump for supplying secondary air to the exhaust manifold 11 through a secondary air gallery 20 and a conduit 22 which connects the secondary air gallery 20 with the exhaust manifold 11 and the secondary air pump 19, and has at its far end an air injecting nozzle 23 opening into the exhaust manifold 11 downstream of an exhaust valve (no numeral) in the engine cylinder head. The secondary air gallery 20 communicates with the casing 18a by way of a passage 21 for introducing secondary air into the outer casing 18a of the fuel reservoir 18.

With the configuration of the present invention described hereinabove, the collapsible chamber 18b of the supplementary fuel reservoir 18 is in communication with the fuel pump 15 through the one-way valve 18c while the casing 18a surrounding the collapsible chamber 18b is in communication with the secondary air pump 19 through the air gallery 20. As mentioned hereinbefore, the secondary air pressure is varied in proportion to the square of the intake air flow rate of the engine and therefore is reduced during low load operating conditions of the engine due to a decrease in the intake air volume of the engine. A decrease in secondary air pressure allows the supplementary fuel from the fuel pump 15 to push the valve 18c open and enter into the collapsible chamber 18b, expanding the same as long as the secondary air pressure has dropped below that of the opening point of the one-way valve 18c. That is, during low load engine operations involving production of nitrogen oxides only in a small amount, supplementary fuel is retained in the collapsible chamber 18b of the fuel reservoir 18 without being supplied to the exhaust system of the engine. However, during high load engine operations, the secondary air pressure within the outer casing 18a is increased due to an increase in the intake air flow of the engine, acting on the collapsible chamber 18b. When the increasing secondary air pressure reaches a point where it is greater than the opening point of the one-way valve 18e, the one-way valve 18e is pushed open by the secondary air pressure acting on the fuel stored in the collapsible chamber 18b, with the result that supplementary fuel stored in the fuel reservoir 18 is supplied to the exhaust system through the supplementary fuel supply nozzle 14 of the upstream end of the reduction catalyst 13 until the fuel reservoir 18 is emptied, thus promoting and completing the intended catalytic reduction of the exhaust gases. In urban areas where air pollution by automotive exhaust gases is strictly restricted, high load engine operations including high speed operations, acceleration, and hill-climbing generally occur only over limited distances or limited time periods. The amount of supplementary fuel to be stored in the fuel reservoir 18 or the capacity of the fuel reservoir 18 should therefore be determined by taking into account the frequency of these high load engine operations in urban areas.

In this connection, the pressure of the injected supplementary fuel is equal to the pressure of the secondary air. These pressures and the velocity ($V'$) of the injected supplementary fuel are in the same relations as expressed by the Equations 1 to 3 given hereinbefore. That is, $$Pa = (\phi/2g) V'^2 \qquad (6)$$

wherein $\phi$ represents the density of the supplementary fuel. Since $Pa \approx KPe$ $$V'^2 \approx CPe \qquad (7)$$

where $C$ represents a proportional constant. From Equation 1 mentioned hereinbefore, we obtain $$V' \approx C'Q_1 \qquad (8)$$

Thus, if we denote the flow rate of the supplementary fuel by $Q$, then $$Q = a \cdot V \approx C'Q_1 \qquad (9)$$

where a denotes the sectional area of the supplementary fuel injection nozzle 14 which is constant. Thus, it will be understood from the foregoing that, in a supplementary fuel supplying device of the invention, the flow rate $Q$ of supplementary fuel supplied to the exhaust system of the engine has a valve proportional to the square of the engine intake air flow $Q_1$.

FIG. 2 shows a modified configuration of a supplementary fuel reservoir 18, wherein the supplementary fuel is stored in the casing 18a instead of in the collapsible chamber 18b. The fuel passages 16 and 17 communicate with the casing 18a similarly by way of spring loaded one-way valves 18c and 18e respectively, while the fixed end of the collapsible chamber 18b is in communication with the secondary air gallery 10 through the air passage 21. It will be understood that this modified embodiment has performance similar to the embodiment shown in FIG. 1.

While specific embodiments of the automotive exhaust emission control apparatus of the invention have been disclosed in the foregoing description, it will be understood that various modifications within the scope of the invention may occur to those skilled in the art. Therefore, it is intended that no limitations be placed on the invention except as defined by the scope of the appednded claims.

What is claimed is:

1. A supplementary fuel supplying device in a system for cleaning exhaust gases emitted from a combustion chamber of an internal combustion engine, comprising a secondary air passageway communicating with an exhaust system leading from an exhaust port of said combustion chamber and connected to a pump for supplying secondary air under pressure into an exhaust manifold of said exhaust system, a catalytic converter mounted in said exhaust system for decomposing pollutants in said exhaust gases, a supplementary fuel supply passageway communicating with said exhaust system upstream of said catalytic converter for supplying supplementary fuel thereto and having a downstream portion connected to said exhaust system and an upstream portion connected to a fuel pump, a supplementary fuel reservoir interposed between said upstream portion and downstream portion of said supplementary fuel supply passageway and having a fuel inlet communicating with said upstream portion of said supplementary fuel supply passageway, a first one-way valve in said upstream portion of said fuel supply passageway allowing flow of fuel only in a direction toward said supplementary fuel reservoir, a fuel outlet communicating with said downstream portion of said supplementary fuel supply passageway, a second one-way valve in said downstream portion of said fuel supply passageway allowing flow of fuel only in a direction toward said exhaust system, said supplementary fuel reservoir communicating with said secondary air passageway through an air port for introducing secondary air under pressure into said fuel reservoir, and a collapsible chamber disposed in said fuel reservoir and having its volume vary in dependence on the pressure level of said secondary air for discharging supplementary fuel stored in said fuel reservoir into said exhaust system at a rate proportional to the square of an intake air flow rate into said engine.

2. A supplementary fuel supplying device as claimed in claim 1, wherein said collapsible chamber in said fuel reservoir is formed of bellows.

3. A supplementary fuel supplying device as claimed in claim 1, wherein said collapsible chamber is fixed at one end thereof to an inner wall of said fuel reservoir and having at the fixed end thereof a fuel inlet in registry with said fuel inlet of said fuel reservoir and at a free end thereof a fuel outlet connected to said fuel outlet of said fuel reservoir by way of a flexible tube.

4. A supplementary fuel supplying device as claimed in claim 3, wherein said collapsible chamber in said fuel reservoir is formed of bellows.

5. A supplementary fuel supplying device as claimed in claim 3, wherein said first one-way valve is provided at a junction between said fuel inlet of said fuel reservoir and said upstream portion of said fuel supply passage, and said second one-way valve is provided at a junction between said fuel outlet of said fuel reservoir and said downstream portion of said fuel supply passageway.

6. A supplementary fuel supplying device as claimed in claim 1, wherein said collapsible chamber is fixed at one end thereof to an inner wall of said fuel reservoir and has at fixed end thereof an air port in registry with said air port of said fuel reservoir.

7. A supplementary fuel supplying device as claimed in claim 6, wherein said air port of said collapsible chamber communicates with an air gallery provided in said secondary air passage.

8. A supplementary fuel supplying device as claimed in claim 6, wherein said collapsible chamber in said fuel reservoir is formed of bellows.

9. A supplementary fuel supplying device as claimed in claim 6, wherein said first one-way valve is provided at said fuel inlet of said fuel reservoir and said second one-way valve is provided at said fuel outlet thereof.

10. A supplementary fuel supplying device as claimed in claim 5, wherein said first and second one-way valves are spring loaded and arranged for said second one-way valve to require a higher pressure to open than said first one-way valve requires.

11. A supplementary fuel supplying device as claimed in claim 9, wherein said first and second one-way valves are spring loaded and arranged for said second one-way valve to require a higher pressure to open than said first one-way valve requires.

* * * * *